(12) United States Patent
Nakayama et al.

(10) Patent No.: US 7,794,026 B2
(45) Date of Patent: Sep. 14, 2010

(54) VEHICLE BRAKING APPARATUS AND RELATED CONTROL METHOD

(75) Inventors: Masanobu Nakayama, Saitama (JP); Kazuya Takenouchi, Saitama (JP); Kazuhiko Tani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 11/297,811

(22) Filed: Dec. 8, 2005

(65) Prior Publication Data
US 2006/0138859 A1    Jun. 29, 2006

(30) Foreign Application Priority Data
Dec. 24, 2004   (JP) ............................. 2004-372918
Dec. 27, 2004   (JP) ............................. 2004-375277

(51) Int. Cl.
    *B60T 8/34*    (2006.01)
(52) U.S. Cl. ................... 303/113.1; 303/137; 303/150; 303/115.2
(58) Field of Classification Search ............... 303/9.64, 303/113.1, 113.4, 115.1, 115.2, 137, 139, 303/149, 150
See application file for complete search history.

(56) References Cited

U.S. PATENT DOCUMENTS

| | | | |
|---|---|---|---|
| 5,209,554 A | | 5/1993 | Beilfuss et al. |
| 5,249,848 A | * | 10/1993 | Matsuto et al. ............. 303/163 |
| 5,416,708 A | | 5/1995 | Matsuto et al. |
| 5,573,313 A | * | 11/1996 | Suzuki et al. ............ 303/115.2 |
| 5,967,623 A | | 10/1999 | Agnew |
| 6,089,682 A | | 7/2000 | Ishikawa et al. |
| 6,290,310 B1 | * | 9/2001 | Kusano ................. 303/122.11 |
| 6,533,369 B2 | * | 3/2003 | Baumgartner et al. ....... 303/155 |
| 6,557,949 B2 | * | 5/2003 | Tani et al. .................. 303/9.64 |
| 6,572,200 B2 | * | 6/2003 | Soga et al. ..................... 303/3 |
| 6,655,751 B2 | * | 12/2003 | Nakano ....................... 303/11 |
| 6,685,278 B2 | * | 2/2004 | Kusano et al. ........... 303/113.4 |
| 6,715,848 B2 | * | 4/2004 | Chen et al. .................. 303/137 |

(Continued)

FOREIGN PATENT DOCUMENTS

DE    19510525    9/1996

(Continued)

*Primary Examiner*—Bradley T King
*Assistant Examiner*—Vu Q Nguyen
(74) *Attorney, Agent, or Firm*—Carrier, Blackman & Associates, P.C.; Joseph P. Carrier; William D. Blackman

(57) ABSTRACT

A vehicle braking apparatus is capable of suppressing time lag at the time of activating an ABS, reliably detecting wheel slippage at a wheel even on a low μ road surface, and performing a brake operation to stop the vehicle without causing stroke variations in a brake actuating unit. A vehicle braking apparatus includes a hydraulic modulator for generating hydraulic pressure applied to a brake caliper which is connected to a master cylinder via a main brake path, and a pressure sensor for detecting hydraulic pressure applied to the brake caliper. When the ABS is activated, the hydraulic pressure applied to the brake caliper is reduced to a pressure reduction target value based on the detected pressure. A normally-open electromagnetic valve lies in the main brake path. The brake path pressure on each side of the valve is equalized by means of the hydraulic modulator before opening the electromagnetic valve.

8 Claims, 8 Drawing Sheets

U.S. PATENT DOCUMENTS

| | | | |
|---|---|---|---|
| 2002/0180262 A1* | 12/2002 | Hara et al. ............... | 303/119.1 |
| 2003/0015916 A1 | 1/2003 | Sakamoto | |
| 2003/0183024 A1 | 10/2003 | Lohberg | |

FOREIGN PATENT DOCUMENTS

| | | |
|---|---|---|
| DE | 19841335 | 8/1999 |
| DE | 19920990 | 12/2000 |
| DE | 10324991 | 7/2004 |
| EP | 0590603 | 4/1994 |
| EP | 1176075 | 1/2002 |
| EP | 1277635 | 1/2003 |
| JP | 04-368267 | 12/1992 |
| JP | 2001-310717 | 11/2001 |

* cited by examiner

VEHICLE BRAKING APPARATUS AND RELATED CONTROL METHOD

CROSS-REFERENCE TO RELATED APPLICATIONS

The present invention claims priority under 35 USC 119 based on Japanese patent applications No. 2004-372918, filed on Dec. 24, 2004, and No. 2004-375277, filed on Dec. 27, 2004. The subject matter of these priority documents is incorporated by reference herein.

BACKGROUND OF THE INVENTION

1. Field of the Invention

This invention relates to a braking apparatus for a vehicle. In particular, this invention relates to an braking apparatus for a motorcycle which employs an electronic braking system.

2. Description of the Background Art

It is well known to provide hydraulic braking devices for vehicles with an antilock brake system (hereafter to be referred to as the "ABS") for suppressing slippage of a wheel under specified conditions. Some hydraulic type vehicle braking devices are capable of electrically controlling the hydraulic pressure applied to a brake caliper by means of a hydraulic modulator. Such a braking apparatus is disclosed, for example, in Japanese published patent document JP 2890215.

In the vehicle braking apparatus described above, when unreasonable amount of slippage is detected at a wheel, the ABS is activated to reduce the hydraulic pressure applied to the brake caliper to a predetermined value, so as to suppress the slippage of the wheel. However, according to this system, there is a slight time lag immediately after the activation of the ABS, even though the time lag is practically negligible.

Some motorcycle braking devices employ an electronic brake system, also known as a so-called brake-by-wire system, which is designed to electrically detect an amount of operation of a brake actuating unit such as a brake lever, and operate a wheel braking mechanism by hydraulic pressure generated by a hydraulic modulator, based on the detected amount of braking operation. Such a braking apparatus is disclosed, for example, in Japanese published patent document JP-A 310717/2001.

In some motorcycles employing the brake-by-wire system, for example, a main brake path having a normally-open electromagnetic on-off valve is connected to a master cylinder. The master cylinder works in conjunction with a brake lever, and is connected to a brake caliper via the main brake path. The brake caliper serves as a wheel driving mechanism and applies a braking force to the wheels by means of a hydraulic pressure operation. A hydraulic modulator, which supplies the brake caliper with hydraulic pressure generated by the electric actuator, is connected to a point in the main brake path closer to the brake caliper relative to the electromagnetic on-off valve.

In this type of braking apparatus, the electromagnetic on-off valve is switched to the closed state only during braking operation by energization of a solenoid, whereby the main brake path is closed. The main brake path is thus separated into the master cylinder side and the brake caliper side, so that a hydraulic pressure corresponding to the hydraulic pressure generated by the brake lever is applied to the brake caliper. As a result, the vehicle is braked.

In the conventional electronic braking apparatus for a motorcycle as described above, the solenoid of each of the electromagnetic on-off valves used in the braking apparatus is required to be energized for performing on/off control of the electromagnetic on-off valve. This poses a problem in that the power consumption of the brake system is increased, and hence, the burden to the battery is increased.

However, if, for the purpose of suppressing the power consumption, the vehicle is configured so that the electromagnetic on-off valve as described above is opened in the non-energized state while the vehicle is at a halt, the electromagnetic on-off valve, which has been closed when the brake is operated, must be switched over to the open state every time the vehicle is stopped by the brake operation. Therefore, if the vehicle is stopped when there is pressure difference between the side of the main brake path closer to the brake caliper relative to the electromagnetic on-off valve and the side of the main brake path closer to the master cylinder relative to the electromagnetic on-off valve, a problem is posed. Specifically, the difference in hydraulic pressure will cause stroke variations in the brake actuating unit when the electromagnetic on-off valve is switched over. This deteriorates the performance of the brake device.

Therefore, an object of this invention is to provide a vehicle braking apparatus which is capable of detecting wheel slippage, and activating the ABS so as to reduce the time lag after the activation of the ABS.

It is a further object of this invention to provide a brake control apparatus for a motorcycle which is capable of performing a brake operation to stop the vehicle without causing stroke variations in a brake actuating unit, and which improves brake device performance.

SUMMARY OF THE INVENTION

To solve the problems described above, a first aspect of the invention relates to a braking apparatus for a vehicle which is designed to activate an ABS by means of hydraulic pressure when wheel slippage is detected during a brake operation. The braking apparatus according to the first aspect hereof includes a hydraulic modulator for generating hydraulic pressure applied to a braking mechanism, and a hydraulic pressure sensor for detecting the hydraulic pressure applied to the braking mechanism. The hydraulic pressure applied to the braking mechanism is reduced to a pressure reduction target value based on the detection result of the hydraulic pressure sensor when activating the ABS.

According to the configuration above, the braking state of the brakes can be constantly monitored by the hydraulic pressure sensor to control the hydraulic modulator, and thus, a pressure reduction target value according to the detection result of the hydraulic pressure sensor can be rapidly obtained when activating the ABS, so as to minimize the time lag. Therefore, the invention has advantageous effects of suppressing the time lag and improving the product performance.

A second aspect of the invention is characterized by the braking apparatus of the first aspect, and further comprises a plurality of wheel speed sensors for detecting a front wheel speed and a rear wheel speed, respectively. The braking apparatus according to the second aspect also includes a slip ratio computing device for computing a front wheel or rear-wheel slip ratio based on the detection results of the wheel speed sensors. The pressure reduction target values are reset, based on a map of the slip ratio and the hydraulic pressure applied to the braking mechanism, the map being pre-stored in the braking apparatus.

According to the configuration above, the pressure reduction value can be optimized according to the slip ratio. Hence, the time lag can be suppressed even further, and thus the product performance can be even more improved.

A third aspect of the invention is characterized by the braking apparatus described above, and further comprises a means for computing an estimated vehicle speed based on the detection result of the wheel speed sensor. The braking apparatus according to the third aspect also includes a road surface monitor, for determining a road surface condition on which the vehicle is running, based on the computed estimated vehicle speed and the hydraulic pressure applied to the front wheel braking mechanism. The invention is characterized in that, when the road surface is determined to be a low μ road surface by the road surface monitor, the pressure reduction target value is reset based on a control map for a low coefficient of friction (μ) road surface, whereas when the road surface is determined to be a high μ road surface by the road surface monitor, the pressure reduction target value is reset based on a control map for a high μ road surface.

According to the configuration above, the control performance of the ABS can be improved for both high μ road surface and low μ road surface. The operability of the ABS can be improved particularly for a low μ road surface.

A fourth aspect of the invention is characterized by the braking apparatus described above, and further comprises a master cylinder which operates in conjunction with a brake actuating unit for brake operation. The invention is characterized in that the hydraulic pressure of the master cylinder is detected, and the braking apparatus performs an ABS activation control by activating the hydraulic modulator according to the detected hydraulic pressure, and a front-wheel and rear-wheel combined brake control.

According to the configuration above, the pressure reduction target value can be set to a more appropriate value even when the front-wheel and rear-wheel combined brake control is performed, and thus the product performance can be improved.

A fifth aspect of the invention is characterized in that the braking apparatus determines whether the ABS is to be activated based on two parameters consisting of the hydraulic pressure applied to the braking mechanism and the slip ratio.

According to the configuration above, the ABS can be activated more appropriately when slippage has occurred at a wheel.

A sixth aspect of the invention relates to braking apparatus for a motorcycle which comprises a master cylinder (e.g., a master cylinder 3 in an embodiment described below) working in conjunction with a brake actuating unit (e.g., a brake actuating unit 2 in the embodiment). The braking apparatus also includes a wheel braking apparatus (e.g., a brake caliper 4 in the embodiment) for applying braking force to a wheel by means of hydraulic pressure operation. A main brake path (e.g., a main brake path 5 in the embodiment) connects the master cylinder and the wheel braking mechanism. A normally-open electromagnetic on-off valve (e.g., a first electromagnetic on-off valve V1 in the embodiment) is provided in the main brake path. The braking apparatus also includes an ABS, which adjusts the hydraulic pressure of the main brake path on the side closer to the wheel braking mechanism relative to the electromagnetic on-off valve by means of a hydraulic modulator (e.g., a hydraulic modulator 6 in the embodiment). The hydraulic modulator is driven by an electric actuator (e.g., an electric motor 23 in the embodiment) to control the slip ratio between a braking wheel and a road surface. The hydraulic modulator is controlled, during the braking operation with the electromagnetic on-off valve being closed, according to the operational state of the brake actuating unit to supply hydraulic pressure to the wheel braking mechanism. The braking apparatus is characterized in that, when the vehicle speed has become a predetermined speed or less (e.g., the vehicle stop state with the vehicle speed=0 in the embodiment) when the vehicle is being braked by the brake actuating unit, the pressure of the main brake path on the side closer to the master cylinder relative to the electromagnetic on-off valve (e.g., an input-side pressure value Pin in the embodiment) and the pressure of the main brake path on the side closer to the wheel braking mechanism relative to the electromagnetic on-off valve (e.g., an output-side pressure value Pout in the embodiment) are detected and equalized by means of the hydraulic modulator before opening the electromagnetic on-off valve.

According to the configuration described above, when the vehicle speed is reduced to a speed less than or equal to a predetermined speed by operation of the brake actuating unit with the electromagnetic on-off valve being closed, even if there is a difference between the hydraulic pressure of the main brake path on the side closer to the brake actuating unit relative to the electromagnetic on-off valve and the hydraulic pressure of the main brake path on the side closer to the wheel braking mechanism, the hydraulic pressure of the main brake path on the side closer to the wheel braking mechanism relative to the electromagnetic on-off valve can be adjusted by the hydraulic modulator. The hydraulic modulator is driven by the electric actuator to equalize the same with the hydraulic pressure of the main brake path on the side closer to the brake actuating unit relative to the electromagnetic on-off valve before opening the electromagnetic on-off valve. Therefore, the electromagnetic on-off valve can be opened without causing stroke variations in the brake actuating unit, and hence the product performance can be improved.

A seventh aspect of the invention is characterized in that, when the vehicle speed has become less than or equal to a predetermined speed, regardless of whether the ABS is operated or not, the input duty ratio of the electric actuator is adjusted to perform adjustment so that the pressure of the main brake path on the side closer to the master cylinder relative to the electromagnetic on-off valve becomes equal to the pressure of the main brake path on the side closer to the wheel driving means relative to the electromagnetic on-off valve.

This configuration makes it possible to control the hydraulic pressure by varying the input duty ratio of the electric actuator. Therefore, the hydraulic pressure can be controlled easily and more correctly.

An eighth aspect of the invention relates to a braking apparatus for a motorcycle which is designed to detect a hydraulic pressure on the side of a master cylinder which operates in conjunction with a brake actuating unit, and to detect a hydraulic pressure on the side of a wheel braking mechanism which applies braking force to a wheel by means of hydraulic pressure operation. The braking apparatus is also designed to operate a hydraulic modulator to generate hydraulic pressure, and to electrically control the hydraulic pressure applied to the wheel braking mechanism side so as to correspond with the hydraulic pressure on the master cylinder side. The braking apparatus is characterized in that, when there is a difference between hydraulic pressure on the master cylinder side and hydraulic pressure on the wheel braking mechanism side after the vehicle speed has become less than or equal to a predetermined vehicle speed, the hydraulic modulator is operated and the hydraulic modulator is controlled to equalize the hydraulic pressure on the master cylinder side and the hydraulic pressure on the wheel braking apparatus side.

This configuration makes it possible to eliminate the difference between the hydraulic pressure on the master cylinder side and the hydraulic pressure on the wheel braking mechanism side after the vehicle speed has become less than or equal to the predetermined speed. Therefore, it is possible to prevent the deterioration of the product performance caused by stroke variations in the brake actuating unit after the vehicle speed has become the predetermined speed or less.

A ninth aspect of the invention is characterized in that the output side of the master cylinder is connected to the input side of the wheel braking mechanism via a hydraulic path (e.g., the main brake path 5 in the embodiment), and an electromagnetic on-off valve (e.g., the first electromagnetic on-off valve V1 in the embodiment) is arranged at a middle portion of the hydraulic path to conduct and block the oil pressure therein. The braking apparatus is configured so that the hydraulic modulator is operated after the vehicle speed has become less than or equal to a predetermined speed, and controlled to equalize the hydraulic pressure on the master cylinder side (e.g., the input-side pressure value $P_{in}$ in the embodiment) and the hydraulic pressure on the wheel braking mechanism side (e.g., the output-side pressure value $P_{out}$ in the embodiment). The energization of the electromagnetic on-off valve is stopped to open the hydraulic path, and to permit conduction of hydraulic fluid therethrough, after the hydraulic pressure on the output side of the master cylinder has become equal to the hydraulic pressure on the input side of the wheel braking mechanism.

According to this configuration, when there is difference between the hydraulic pressure in the hydraulic path on the output-side of the master cylinder and the hydraulic pressure in the hydraulic path on the input-side of the wheel braking apparatus after the vehicle speed has become the predetermined speed or less, the hydraulic modulator can be controlled so as to equalize the hydraulic pressure on the master cylinder side and the hydraulic pressure on the wheel braking mechanism side, so that energization of the electromagnetic on-off valve is stopped to permit free flow within the oil pressure path, after these hydraulic pressures have become equal to each other. Therefore, it is possible to prevent the deterioration of the product performance caused by stroke variations in the brake actuating unit after the stoppage of the vehicle.

A tenth aspect of the invention is characterized in that it is determined whether or not the vehicle speed is a predetermined speed or less when the state of the vehicle is continuous for a predetermined time or more.

This configuration makes it possible to adjust the hydraulic pressure in a vehicle condition equivalent to a halt. Therefore, no uncomfortable sensation is given to the rider when operating.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
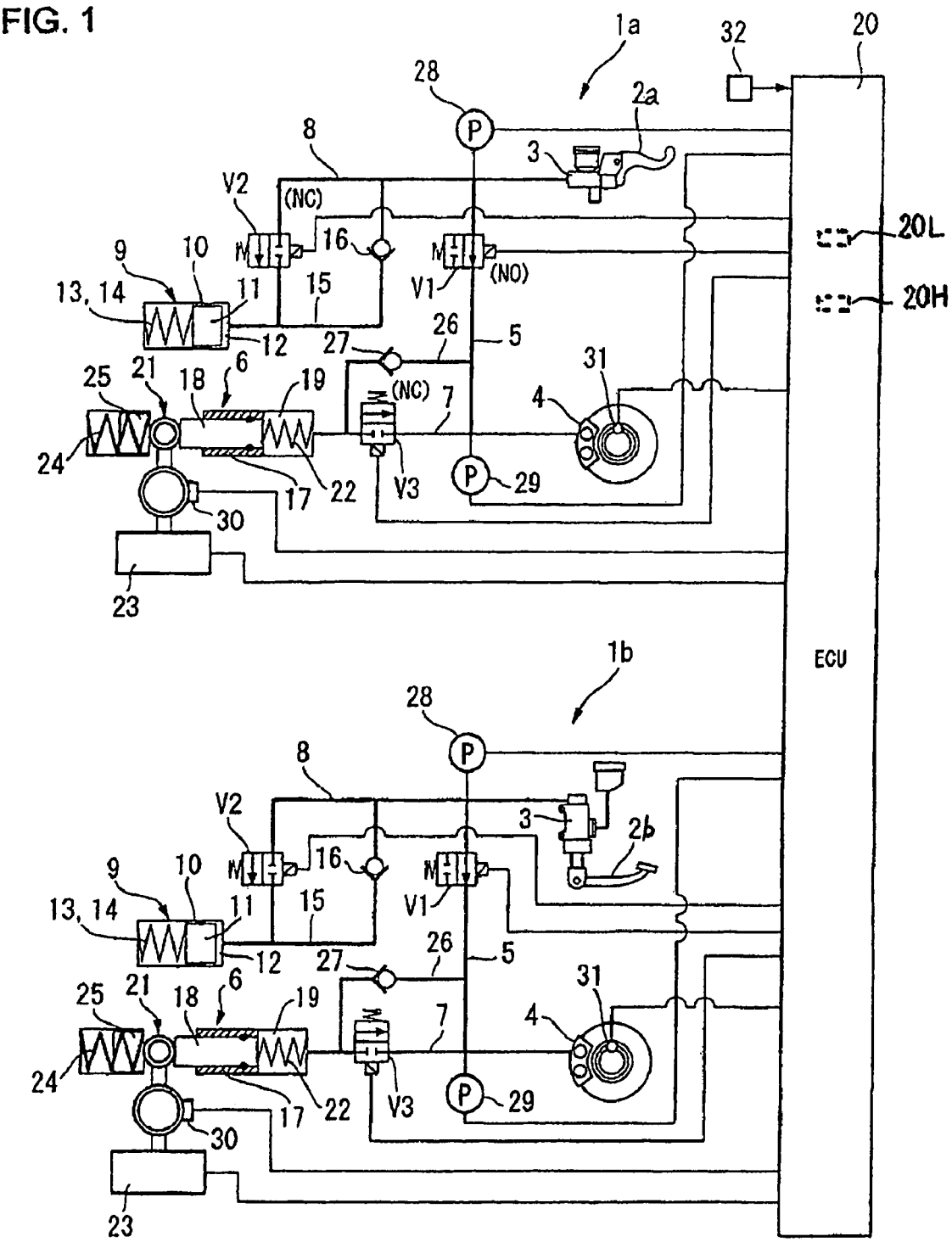
FIG. 1 is a schematic hydraulic circuit diagram of a braking apparatus for a motorcycle according to an illustrative embodiment of the present invention.

FIG. 1 is a schematic hydraulic circuit diagram illustrating a braking apparatus for a motorcycle according a selected illustrative embodiment of the present invention. As shown in FIG. 1, the braking apparatus of this embodiment includes a front-wheel brake circuit 1a and a rear-wheel brake circuit 1b which are interlinked by an electronic control unit (ECU), also referred to herein as a controller 20.

Brake operation of the front-wheel brake circuit 1a is actuated by manual operation of a brake lever 2a, serving as a front wheel brake actuating unit, while brake operation of the rear-wheel brake circuit 1b is performed with a brake pedal 2b, serving as a rear wheel brake actuating unit. Since the other configuration features are substantially similar between the front-wheel brake circuit 1a and the rear-wheel brake circuit 1b, the following description will be made only of the front-wheel brake circuit 1a. As for the rear-wheel brake circuit 1b, those elements which are identical to those of the front-wheel brake circuit 1a are assigned with identical reference numeral to the front-wheel brake circuit 1a, and redundant overlapping description will be omitted.

This braking apparatus employs an electronic brake system for both the front and rear wheels. An amount or extent of operation (hydraulic pressure in this embodiment) of the brake actuating unit, such as a brake lever 2a, is electrically detected, and braking force is generated by means of hydraulic pressure, which is generated by a hydraulic modulator based on the detected value of pressure applied. This braking apparatus also employs a combined brake system (CBS) which enables the front and rear wheel braking mechanism to perform coordinated braking operation in conjunction with each other, by selectively operating either or both of the front or rear wheels.

More specifically, in the brake circuit (for example, the front wheel brake circuit) in which the brake actuating unit has been operated first (for example, brake lever 2a), the hydraulic pressure applied by a hydraulic modulator, based on the hydraulic pressure in a master cylinder, is applied to a brake caliper of the first operated side by the electronic brake system. Also, in the later operated brake circuit (for example, the rear wheel brake circuit), the hydraulic pressure applied by a hydraulic modulator, based on the master cylinder pressure of the first operated brake circuit, is applied to the rear brake caliper by the electronic brake system.

Further, this braking apparatus employs an antilock brake system (ABS), to control the slip ratio between the braking wheel and the road surface, when the brake operation is performed.

Each of the brake circuits 1a, 1b is formed by connecting a master cylinder 3, which works in conjunction with the brake actuating unit 2a or 2b, to a brake caliper 4, which is operatively associated with a wheel of the vehicle. The brake caliper 4 is also associated with the master cylinder 3, by means of a main brake path 5. A hydraulic modulator 6, to be described later, is merged with and connected to a middle portion of the main brake path 5 by means of a supply and exhaust path 7.

The main brake path 5 has a normally-open (NO) first electromagnetic on-off valve V1 (isolation valve), which is mounted therein at a position closer to the master cylinder 3 than to the merging and connecting point with the supply and exhaust path 7. The first electromagnetic on-off valve V1 acts to selectively connect the master cylinder 3 to the brake caliper 4, or to block the master cylinder 3 from the brake caliper 4. The first electromagnetic on-off valve V1 also has a branch path 8 operatively connected thereto. The branch path 8 is connected to a fluid-loss simulator 9 via a normally-closed (NC) second electromagnetic on-off valve V2. The fluid-loss simulator 9 applies a pseudo-hydraulic pressure reaction force to the master cylinder 3, corresponding to the operational pressure applied to the brake actuating unit 2, when the first electromagnetic on-off valve V1 closes the main brake path 5. The second electromagnetic on-off valve V2 opens the branch path 8 when the reaction force is applied, to establish communication between the master cylinder 3 side and the fluid-loss simulator 9 side.

In the fluid-loss simulator 9, a piston 11 is arranged to be movable back and forth within a cylinder 10. A fluid chamber 12 is defined between the cylinder 10 and the piston 11, to receive hydraulic fluid flowing from the master cylinder 3 side. A coil spring 13 and a plastic spring 14 are arranged in series at the rear side of the piston 11. The plastic spring 14 has a different characteristic than the coil spring 13, so that these two springs 13 and 14 allow the reaction force applied to the piston 11, and thus to the brake actuating unit 2, to rise gently and to fall sharply at the stroke end.

The branch path 8 is provided with a bypass path 15, which bypasses the second electromagnetic on-off valve V2. The bypass path 15 is provided with a check valve 16 which permits the flow of hydraulic fluid in the (return) direction from the fluid-loss simulator 9 to the master cylinder 3.

The hydraulic modulator 6 has a piston 18 arranged in a cylinder 17. The hydraulic modulator also includes a cam mechanism 21, which is operable to press the piston 18 towards a hydraulic chamber 19 defined between the cylinder 17 and the piston 18. The hydraulic modulator 6 also includes a return spring 22, which normally presses the piston 18 towards the cam mechanism 21, and an electric motor 23 for activating the cam mechanism 21. The hydraulic chamber 19 communicates, and is connected with, the supply and exhaust path 7. The hydraulic modulator 6 is designed to increase or reduce the pressure in the hydraulic chamber 19, for correspondingly increasing or reducing the braking pressure applied by the brake caliper 4. This is achieved by driving the piston 18 by means of the associated electric motor 23 via the cam mechanism 21, or returning the piston 18 by means of the return spring 22, on the basis of the initial position of the cylinder 17.

The electric motor 23 is designed to adjust the current value, which is determined by pulse width modulation (PWM) control according to an input duty ratio (ON time/(ON time+OFF time)), so that the position of the piston 18, determined according to the rotational position of the cam mechanism 21 described above, can be electrically adjusted in an accurate and simple manner to adjust the pressure in the hydraulic chamber 19.

The cam mechanism 21 is provided with a lifter 25, arranged so as to be movable back and forth. The stroke of the lifter 25 is restricted by a stopper (not shown in the drawing) by means of a backup spring 24. The piston 18 is normally urged by the lifter 25 in the direction of contracting the hydraulic chamber 19. Thus, when the electric motor 23 is in the non-energized state, the lifter 25 is pressed by the backup spring 24 and stopped by the stopper to return the piston 18 to its initial position. This configuration makes it possible to implement both the CBS control, for positively supplying hydraulic fluid to the main brake path 5 (brake caliper 4), and the ABS control for reducing, holding, and re-increasing the pressure in the hydraulic chamber 19 by moving the piston 18 back and forth.

The supply and exhaust path 7 is provided with a normally-closed (NC) third electromagnetic on-off valve V3. The supply and exhaust path 7 is also provided with a bypass path 26, which bypasses the third electromagnetic on-off valve V3. The bypass path 26 is provided with a check valve 27 which permits flow of hydraulic fluid in the (return) direction from the hydraulic modulator 6 to the brake caliper 4.

The front-wheel brake circuit 1a and the rear-wheel brake circuit 1b are each provided with an input pressure sensor (P) 28 which detects the pressure of the master cylinder 3 side, or the input side relative the first electromagnetic on-off valve V1, and an output pressure sensor (P) 29 which detects the pressure of the brake caliper 4 side, or the output side. Further, an angle sensor 30 for providing angular position information is provided on the cam shaft (not shown) of the cam mechanism 21, while a wheel speed sensor 31 for detecting wheel speed is provided on the brake caliper 4. A mode selector switch 32 is also provided which permits a rider to manually select a control mode. For example, if the CBS control is desired, the rider operates the mode selector switch 32 to select the CBS control mode. The following description will be made of a case in which the CBS control is selected.

The controller 20 performs on/off control of the first electromagnetic on-off valve V1, the second electromagnetic on-off valve V2, and the third electromagnetic on-off valve V3. The controller 20 also performs drive control of the electric motor 23, based on detection signals from the pressure sensors 28 and 29, a detection signal from the angle sensor 30, and a detection signal from the wheel speed sensor 31.

More specifically, when one of the brake actuating units 2a, 2b is operated, the controller 20 receives the speed of the front and rear wheels at that time from the wheel speed sensors 31, as well as information on the amount of brake operation and the like through the input pressure sensors 28. Thereupon, the first electromagnetic on-off valves V1 of both of the brake circuits are maintained in the direction that closes the main brake path 5 according to a command from the controller 20. At the same time the electromagnetic on-off valves V2 and V3 are maintained in the direction which opens the main brake path 5. Both hydraulic modulators 6 supply the brake calipers 4 with a hydraulic pressure corresponding to the operating condition and brake operation of the vehicle.

The controller 20 sets, as an estimated vehicle speed, the higher one of the wheel speeds detected by the front wheel speed sensor 31 and the rear wheel speed sensor 31. The controller 20 further computes a front-wheel slip ratio or rear-wheel slip ratio based on a difference between the estimated vehicle speed and the front or rear wheel speed. If the front-wheel slip ratio or the rear-wheel slip ratio exceeds a predetermined threshold value for the slip ratio, the controller 20 determines that the wheel has slipped and starts the ABS control to reduce the hydraulic pressure of the hydraulic modulator 6.

According to the configuration as described above, when the vehicle is at a halt (vehicle speed=0), as shown FIG. 1, the first electromagnetic on-off valve V1 is open, the second electromagnetic on-off valve V2 is closed, and the third electromagnetic on-off valve V3 is closed, in each of the front-wheel brake circuit 1a and the rear-wheel brake circuit 1b. Therefore, the electromagnetic on-off valves V1, V2 and V3 require no power at all.

Figure 2:
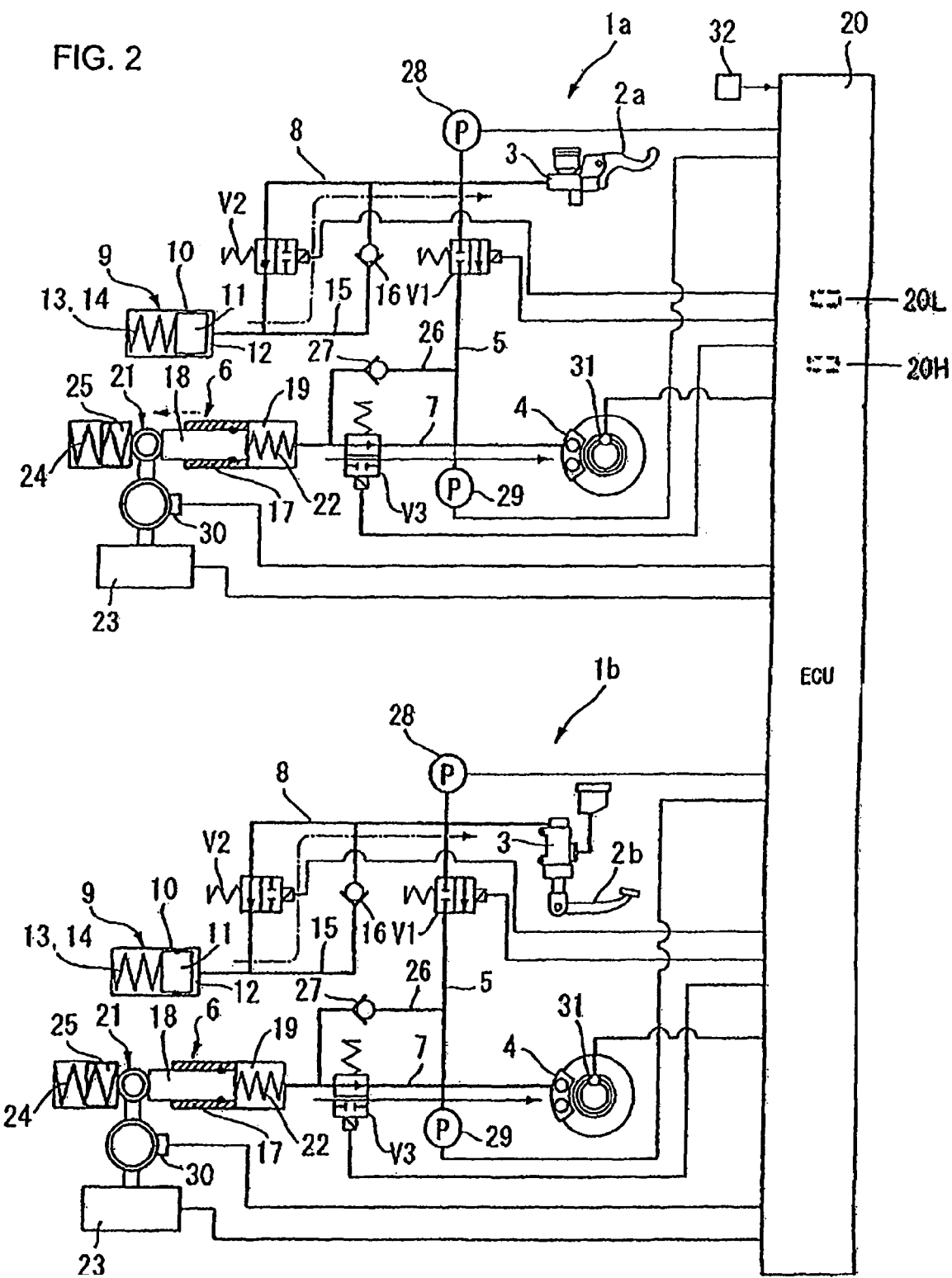
FIG. 2 is a schematic hydraulic circuit diagram of the braking apparatus of FIG. 1, as configured during a braking operation and during operation of a front-wheel ABS according to the illustrative embodiment of FIG. 1.

When the rider operates the front brake lever 2a, serving as the front wheel brake actuating unit while the vehicle is running, as shown in FIG. 2, the first electromagnetic on-off valve V1 is closed, and the second electromagnetic on-off valve V2 and the third electromagnetic on-off valve V3 are opened in the front-wheel brake circuit 1a. Consequently, the main brake path 5 is separated from the master cylinder 3 by the closing of the first electromagnetic on-off valve V1. At the same time, the branch path 8 and the main brake path 5 connect the master cylinder 3 and the fluid-loss simulator 9 as the result of the opening of the second electromagnetic on-off valve V2. Further, the supply and exhaust path 7 and the main brake path 5 connect the hydraulic modulator 6 and the brake caliper 4 as a result of the opening of the third electromagnetic on-off valve V3.

Simultaneously therewith, in the rear-wheel brake circuit 1b, the first electromagnetic on-off valve V1 is closed, and the second electromagnetic on-off valve V2 and the third electromagnetic on-off valve V3 are opened. Consequently, the main brake path 5 is separated from the master cylinder 3 by the closing of the first electromagnetic on-off valve V1. At the same time, the branch path 8 and the main brake path 5 connect the master cylinder 3 and the fluid-loss simulator 9 as the result of the opening of the second electromagnetic on-off valve V2, and further, the supply and exhaust path 7 and the main brake path 5 connect the hydraulic modulator 6 and the brake caliper 4 as a result of the opening of the third electromagnetic on-off valve V3.

As a result, the rider perceives the feeling of a brake operation on the front or rear wheel side where the feeling of brake operation is reproduced in a pseudo manner by the fluid-loss simulators 9 of the front-wheel or rear-wheel brake circuit 1a or 1b (see the alternate long and short dash line arrows in FIG. 2). At the same time, the variation in the hydraulic pressure caused by the operation of the hydraulic modulator 6 is not transmitted to the rider because the first electromagnetic on-off valve V1 is closed. At this time, the electric motor 23 of the hydraulic modulator 6 is activated in parallel with this, and the piston 18 is pressed by the cam mechanism 21 to apply pressure to the hydraulic fluid in the hydraulic chamber 19. As the result, a hydraulic pressure according to control of the electric motor 23 is supplied to the brake caliper 4 through the main brake path 5 (see the solid line arrows in FIG. 2).

In the event it is detected by the wheel speed sensor 31 that the front wheel or the rear wheel (the front wheel in FIG. 2, for example) has come close to slippage and lock, the controller 20 controls the electric motor 23 to move the piston 18 backwards (indicated by the broken line arrow in FIG. 2) to reduce the braking pressure of the brake caliper 4 so that the wheel is prevented from locking by means of the ABS control. During this operation, the first electromagnetic on-off valve V1 is closed to shut off the communication between the master cylinder 3 and the hydraulic modulator 6, and hence pressure variations caused by the ABS control are not transmitted to the brake actuating unit 2 of the rider.

The above description has been made for a case in which the vehicle is stopped by the operation of the brake actuating unit 2 without activating the ABS. However, similar control is also possible when the vehicle is stopped while the ABS is activated. Specifically, when the ABS is activated, since the ABS will reduce, hold, and re-increase the pressure in the hydraulic chamber 19, the magnitude relationship between the pressure on the master cylinder 3 side and the pressure on the brake caliper 4 side cannot be determined according to the time point at which the vehicle stopped. Therefore, the driving of forward and reverse directions of the electric motor 23 is used and PWM controlled to adjust the current value, which is decided according to the input duty ratio. In this manner, the position of the piston 18, decided according to the rotational position of the cam mechanism 21, can be electrically adjusted correctly and easily, regardless of whether it is adjusted to increase the pressure or to reduce the pressure.

When the ABS is activated, the hydraulic pressure applied to the brake caliper 4 is reduced by the hydraulic modulator 6. It should be noted in this regard that, if a fixed pressure reduction value is constantly used, the extent of pressure reduction sometimes exceeds a necessary level for the slip ratio, which indicates a proportion of slippage of the wheels. To solve this problem, an appropriate hydraulic pressure is set for the brake caliper 4 during activation of the ABS to improve the operational stability of the ABS. The following description will be made of the hydraulic pressure control when the ABS is activated.

Figure 3:
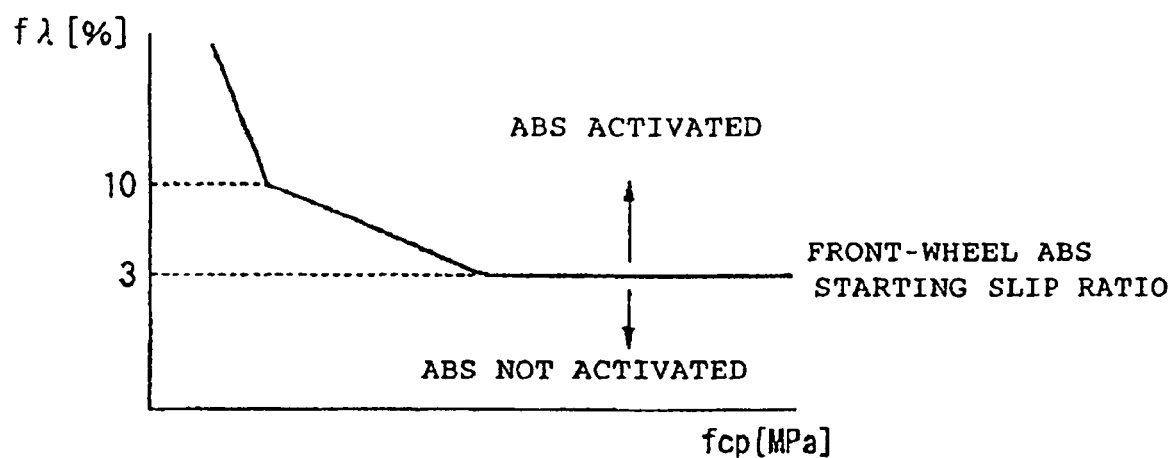
FIG. 3 is a graph of the hydraulic pressure reduction target value for the front-wheel, showing brake caliper pressure (MPa) versus the front-wheel slip ratio (percentage) according to the illustrative embodiment of this invention.

FIG. 3 is a map illustrating an ABS control range in which the front-wheel slip ratio $f\lambda$(%) is plotted on the vertical axis, while the hydraulic pressure fcp (MPa), which is the detection result of the front wheel pressure sensor 29, is plotted on the horizontal axis. The front-wheel ABS starting slip ratio shown in the map is a slip ratio that defines a threshold value based on which activation or non-activation of the ABS is decided. The front-wheel slip ratio $f\lambda$ is computed based on a difference between a front-wheel speed and an estimated vehicle speed.

The front-wheel ABS starting slip ratio may be set, for example, so that the front-wheel ABS starting slip ratio becomes its maximum when the hydraulic pressure fcp is low, drops rapidly to a first slip ratio (e.g., about 10%) upon increase of the hydraulic pressure fcp, then gently drops until reaching a second slip ratio (e.g., about 3%) along with the continued increase of the hydraulic pressure fcp, and, after reaching the second slip ratio, remains at a fixed slip ratio. An ABS activated range, in which the ABS is activated, is set in the area where the front-wheel slip ratio fλ is equal to or higher than the ABS starting slip ratio. Similarly, an ABS non-activated range, in which the ABS is not activated, is set in the area where the front-wheel slip ratio fλ is lower than the ABS starting slip ratio. According to the conventional techniques, the hydraulic pressure of the brake caliper 4 is reduced uniformly when the ABS is operated. This poses a problem in that there may occur a time lag even though such time lag is practically negligibly small. According to the present embodiment, however, the ABS start timing can be adjusted according to the magnitude of the hydraulic pressure fcp and hence such time lag can be made even smaller.

Figure 4:
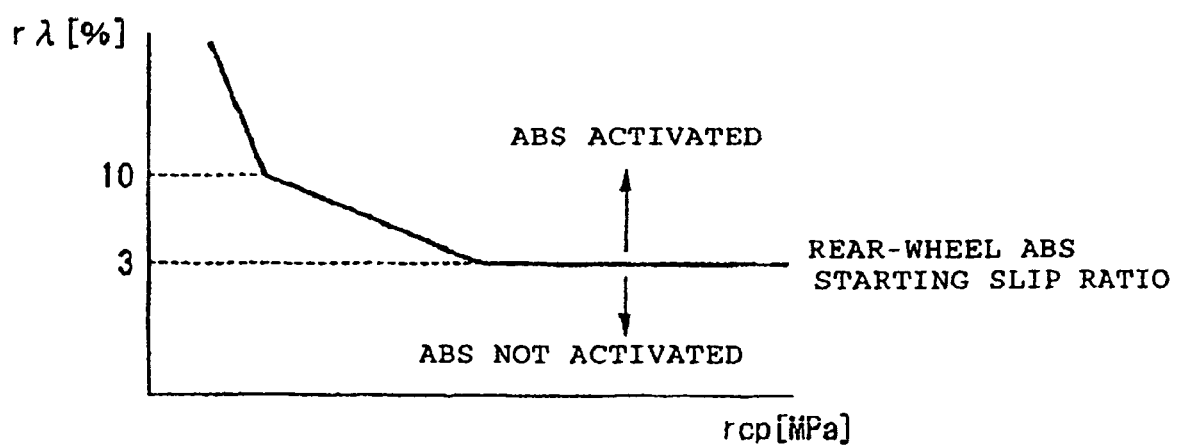
FIG. 4 is a graph of the hydraulic pressure reduction target value for the rear wheel master cylinder showing brake caliper pressure (MPa) versus the rear-wheel slip ratio (percentage) according to the illustrative embodiment of this invention.

FIG. 4 is also a map illustrating an ABS control range in which the rear-wheel slip ratio fλ(%) is plotted on the vertical axis, while the hydraulic pressure rcp (MPa), which is the detection result of the rear-wheel pressure sensor 29, is plotted on the horizontal axis. Also in FIG. 4, like FIG. 3, the rear-wheel ABS starting slip ratio may be set, for example, so that the rear-wheel ABS starting slip ratio becomes its maximum when the hydraulic pressure rcp is low, drops as the hydraulic pressure fcp is increased until it reaches a predetermined slip ratio, and thereafter remains at a fixed slip ratio even if the front-wheel ABS starting slip ratio described above, an ABS activated range, in which the ABS is activated, is set in the area where the rear-wheel slip ratio fλ is equal to or higher than the ABS starting slip ratio. Correspondingly, an ABS non-activated range, in which the ABS is not activated, is set in the area where the rear-wheel slip ratio fλ is lower than the ABS starting slip ratio.

Figure 5:
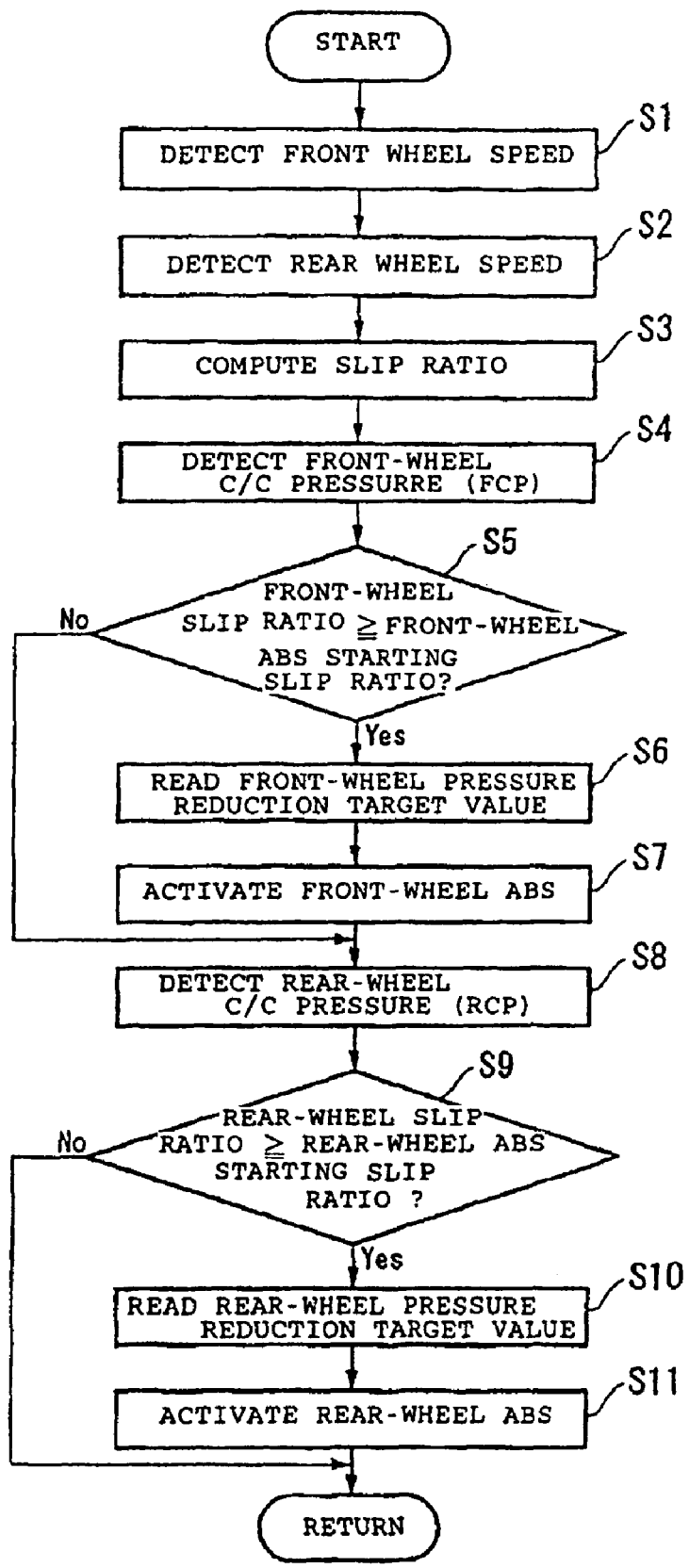
FIG. 5 is a flowchart illustrating the ABS activation process using a pressure reduction target value according to the illustrative embodiment of this invention.

Description will now be made, with reference to the flowchart of FIG. 5, of an ABS activation process using a front-wheel pressure reduction target value and a rear-wheel pressure reduction target value.

In step S1 and step S2, a front wheel speed and a rear-wheel speed are detected, respectively. In step S3, a slip ratio of each of the front and rear wheels is computed based on the detected front wheel speed and the rear-wheel speed. In step S4, a hydraulic pressure fcp in the front-wheel brake caliper cylinder (hereafter, to be referred to simply as the "front-wheel C/C") is detected.

In step S5, it is determined whether or not the front-wheel slip ratio is the front-wheel ABS starting slip ratio or higher, based on the map of FIG. 3. If the determination result is "YES" (the front-wheel slip ratio is equal to or higher than the front-wheel ABS starting slip ratio), the processing proceeds to step S6, whereas if the determination result is "NO" (the rear-wheel slip ratio is lower than the front-wheel ABS starting slip ratio), the processing proceeds to step S8.

Figure 7:
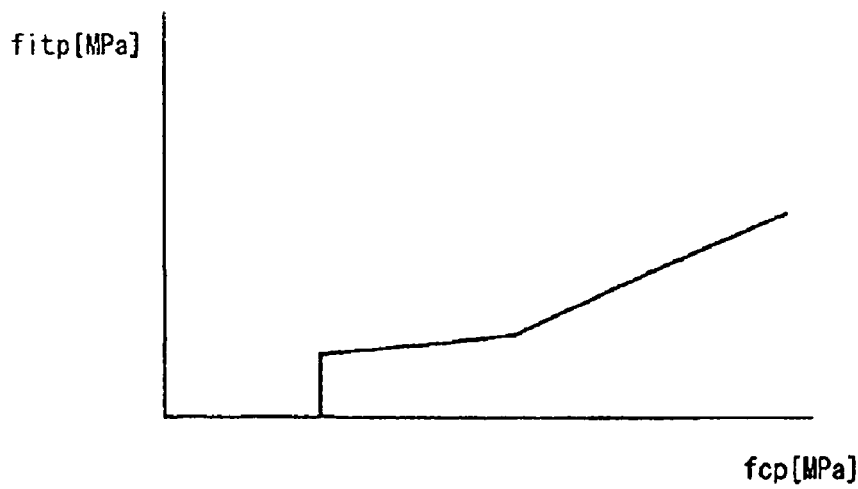
FIG. 7 is a graph illustrating the pressure reduction target value versus the hydraulic pressure of the front-wheel brake caliper according to the illustrative embodiment of this invention.

In step S6, the front-wheel pressure reduction target value is read from the map in FIG. 7. In step S7, the hydraulic pressure fcp in the front-wheel C/C is reduced based on the front-wheel pressure reduction target value (antilock for the front wheel). The ABS control according to the slippage condition is then continued. In step S8, the hydraulic pressure rcp in the rear-wheel brake caliper cylinder (hereafter, to be referred to simply as the "rear-wheel C/C") is detected. In step S9, it is determined based on the map in FIG. 4 whether or not the rear-wheel slip ratio is equal to or higher than the rear-wheel ABS starting slip ratio. If the determination result is "YES" (the rear-wheel slip ratio is equal to or higher than the rear-wheel ABS starting slip ratio), the processing proceeds to step S10, whereas if the determination result is "NO" (the rear-wheel slip ratio is lower than the rear-wheel ABS starting slip ratio), the processing is terminated and returned. In step S1, a rear-wheel pressure reduction target value is read from the map in FIG. 8. In step S11, the hydraulic pressure rcp in the rear-wheel C/C is reduced on the basis of the rear-wheel pressure reduction target value (antilock for the rear wheel).

Description will now be made of an example of setting of the above-mentioned front-wheel pressure reduction target value and rear-wheel pressure reduction target value.

FIG. 7 shows the relationship of the hydraulic pressure fcp of the front-wheel C/C (MPa: horizontal axis) to the front-wheel pressure reduction target value fitp (MPa: vertical axis) at the moment of starting activation of the ABS. The front-wheel pressure reduction target value fitp can be varied according to the magnitude of the hydraulic pressure fcp of the front wheel C/C at the moment of starting activation of the ABS. Specifically, the setting is made so that, if the hydraulic pressure fcp of the front-wheel C/C at the moment of starting activation of the ABS is small, the front-wheel pressure reduction target value fitp is set to zero and no pressure reduction is performed. When the hydraulic pressure fcp of the front-wheel C/C reaches a predetermined value, the front wheel target value will rise, and as the hydraulic pressure fcp of the front-wheel C/C at the moment of starting activation of the ABS increases, the front-wheel pressure reduction target value fitp also becomes larger.

Figure 8:
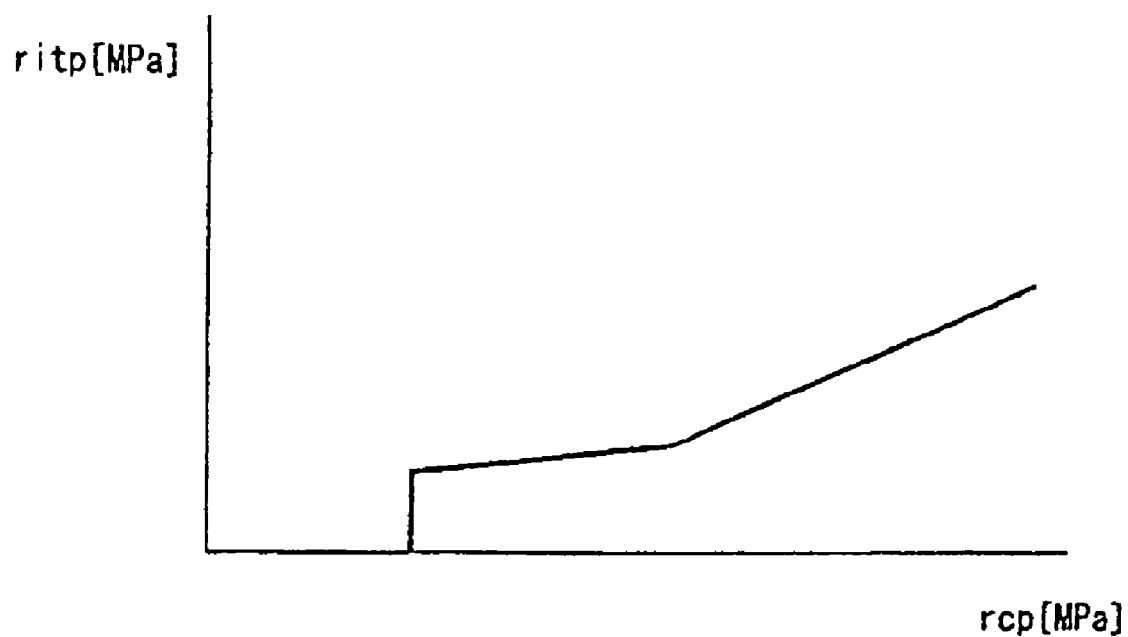
FIG. 8 is a graph illustrating the pressure reduction target value versus the hydraulic pressure of the rear wheel brake caliper according to the illustrative embodiment of this invention.

FIG. 8 shows the relationship of the rear-wheel pressure reduction target value ritp (MPa: vertical axis) to the hydraulic pressure rcp of the rear-wheel C/C (MPa: horizontal axis) at the moment of starting activation of the ABS. Similar to the relationship between the front-wheel pressure reduction target value fitp and the hydraulic pressure fcp of the front-wheel C/C at the moment of starting activation of the ABS as shown in FIG. 7, the rear-wheel pressure reduction target value fitp can be varied according to the magnitude of the hydraulic pressure rcp of the rear wheel C/C at the moment of starting activation of the ABS. The front-wheel pressure reduction target value and the rear-wheel pressure reduction target value are variable depending on characteristics of the vehicle or specifications of the brake system. Therefore, the target values are set according to the type of the vehicle on which the brake system is mounted. Thus, it is made possible to adjust the pressure reduction amount immediately after the activation of the ABS, to suppress the time lag at the time of activating the ABS, and to improve the braking feeling.

Figure 6:
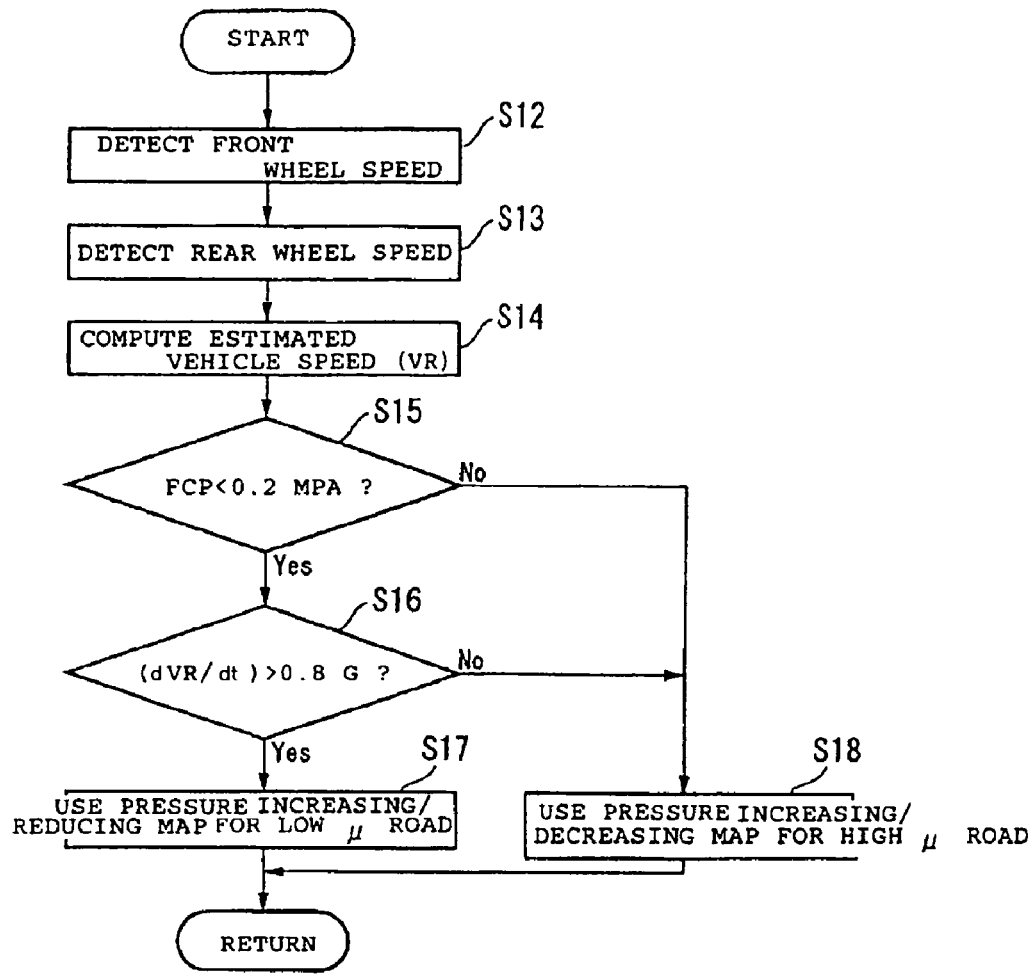
FIG. 6 is a flowchart illustrating a map switching determination process according to the illustrative embodiment of this invention.

Description will now be made, with reference to the flowchart of FIG. 6, of the process for determining the switching of maps. This process determines which map is to be used, the ABS control range map 20L (FIG. 1) for low μ road surface (pressure increasing/reducing map for low μ road) or the ABS control range map 20H for high μ road surface (pressure increasing/reducing map for high μ road). The flowchart of FIG. 6 shows an example of a map switching determination process which employs the detection result of the front-wheel pressure sensor.

In step S12 and step S13, the front wheel speed and the rear-wheel speed are detected, respectively. In step S14, a device for computing an estimated vehicle speed computes an estimated vehicle speed VR based on the front wheel speed and the rear-wheel speed. The estimated vehicle speed is a vehicle speed which is estimated by higher one of the front-wheel speed and the rear-wheel speed as the vehicle's current speed.

In step S15, a road surface monitor determines whether or not the hydraulic pressure fcp of the front-wheel brake caliper is lower than 0.2 MPa. If the determination result is "YES" (i.e., the hydraulic pressure fcp is lower than 0.2 MPa), the processing proceeds to step S16, whereas if the determination result is "NO" (i.e., the hydraulic pressure fcp is 0.2 MPa or more), the processing proceeds to step S18. The threshold value for the hydraulic pressure fcp used in step S15 is not limited to 0.2 MPa, but may be selected as required.

In step S16, the road surface monitor determines whether or not the variation of the estimated vehicle speed per unit time (dVR/dt) is greater than 0.8 G If the determination result is "YES" (i.e., greater than 0.8 G), the processing proceeds to step S17. If the determination result is "NO" (i.e., 0.8 G or less), the processing proceeds to step S18. In step S17, the map is switched to the pressure increasing/reducing map for low μ road surface and the processing is returned. On the other hand, in step S18, the pressure increasing/reducing map for high μ road surface (not shown) is used, and the processing is completed and returned. It should be noted that the threshold value for the variation in hydraulic pressure used in step S16 is not limited to 0.8 G, but may be selected and used as required.

When the front-wheel brake actuating unit 2a is operated by the rider, it is determined whether the road on which the vehicle is running is a low μ road surface such as a frozen road surface or a high μ road surface such as a normal road surface, based on the deceleration "G" of the vehicle and the hydraulic pressure of the brake caliper 4, so that the ABS control is optimized based on the map according to the road surface condition thus determined.

According to the illustrative embodiment above, therefore, when the rider operates the front-wheel or rear-wheel brake actuating unit 2a, 2b to apply braking force to the wheel from the brake caliper 4, the controller 20 computes the front-wheel slip ratio fλ or the rear-wheel slip ratio rλ based on the detection results of the front wheel and rear wheel speed sensors 31 and 31. When this front-wheel slip ratio fλ or the rear-wheel slip ratio rλ becomes higher than the front-wheel ABS starting slip ratio, the piston 18 of the hydraulic modulator 6 can be moved to the pressure reduction side to reduce the hydraulic pressure of the respective brake calipers 4.

The front-wheel pressure reduction target value fitp or the rear-wheel pressure reduction target value ritp is optimized based on the hydraulic pressure fcp or rcp of the front-wheel or rear-wheel C/C at the moment when the activation of the ABS is started, according to the maps shown in FIG. 7 and FIG. 8. For example, in the region where the hydraulic pressure fcp or rcp of the brake caliper 4 is low, the front-wheel pressure reduction target value fitp or rear-wheel pressure reduction target value ritp is set to be zero. Whereas, in the region where the hydraulic pressure of the brake caliper 4 is high, the front-wheel pressure reduction target value fitp or the rear-wheel pressure reduction target value ritp is set to a value higher than the value used in the conventional art. Accordingly, the time lag after the activation of the ABS can be suppressed, thus the braking feeling is improved, and the product performance can be improved.

Further, when the brake actuating unit 2a, 2b is operated by the rider, the slip ratio can be computed based on the detection result of the front-wheel pressure sensor 28 and the detection result of the front-wheel and rear-wheel speed sensors 31, 31 to determine whether the road surface is a high μ road surface or a low μ road surface. Therefore, the ABS control performance can be enhanced by using the maps respectively corresponding to the high μ road surface and low μ road surface.

As stated above, when the rider operates the brake lever 2a, serving as the front wheel brake actuating unit 2, while the vehicle is running, as shown in FIG. 2, the first electromagnetic on-off valve V1 is closed, and the second electromagnetic on-off valve V2 and the third electromagnetic on-off valve V3 are opened in the front-wheel brake circuit 1a. Consequently, the main brake path 5 is separated from the master cylinder 3 by the closing of the first electromagnetic on-off valve V1. At the same time, the branch path 8 and the main brake path 5 connect the master cylinder 3 and the fluid-loss simulator 9 as the result of the opening of the second electromagnetic on-off valve V2. Further, the supply and exhaust path 7 and the main brake path 5 connect the hydraulic modulator 6 and the brake caliper 4 as a result of the opening of the third electromagnetic on-off valve V3.

Simultaneously therewith, in the rear-wheel brake circuit 1b, the first electromagnetic on-off valve V1 is closed, and the second electromagnetic on-off valve V2 and the third electromagnetic on-off valve V3 are opened. Consequently, the main brake path 5 is separated from the master cylinder 3 by the closing of the first electromagnetic on-off valve V1. At the same time, the branch path 8 and the main brake path 5 connect the master cylinder 3 and the fluid-loss simulator 9 as the result of the opening of the second electromagnetic on-off valve V2, and further, the supply and exhaust path 7 and the main brake path 5 connect the hydraulic modulator 6 and the brake caliper 4 as a result of the opening of the third electromagnetic on-off valve V3.

As a result, the rider perceives the feeling of a brake operation on the front or rear wheel side where the feeling of brake operation is reproduced in a pseudo manner by the fluid-loss simulators 9 of the front-wheel or rear-wheel brake circuit 1a or 1b (see the alternate long and short dash line arrows in FIG. 2). At the same time, the variation in the hydraulic pressure caused by the operation of the hydraulic modulator 6 is not transmitted to the rider because the first electromagnetic on-off valve V1 is closed. At this time, the electric motor 23 of the hydraulic modulator 6 is activated in parallel with this, and the piston 18 is pressed by the cam mechanism 21 to apply pressure to the hydraulic fluid in the hydraulic chamber 19. As the result, a hydraulic pressure according to control of the electric motor 23 is supplied to the brake caliper 4 through the main brake path 5 (see the solid line arrows in FIG. 2).

The CBS control is executed in this manner so that the hydraulic pressure supplied from each of the hydraulic modulators 6 to the corresponding brake caliper 4 is controlled so as to establish a predetermined ratio between the hydraulic pressure in the front-wheel master cylinder 3 and the hydraulic pressure in the rear wheel master cylinder 4. Specifically, on the front wheel side, a pressure corresponding to the front wheel master cylinder pressure is applied to the front-wheel brake caliper 4 by the hydraulic modulator 6. On the rear wheel side, a pressure at a certain ratio to the front wheel master cylinder pressure is applied to the rear-wheel master cylinder 4 by the hydraulic modulator 6.

Figure 9:
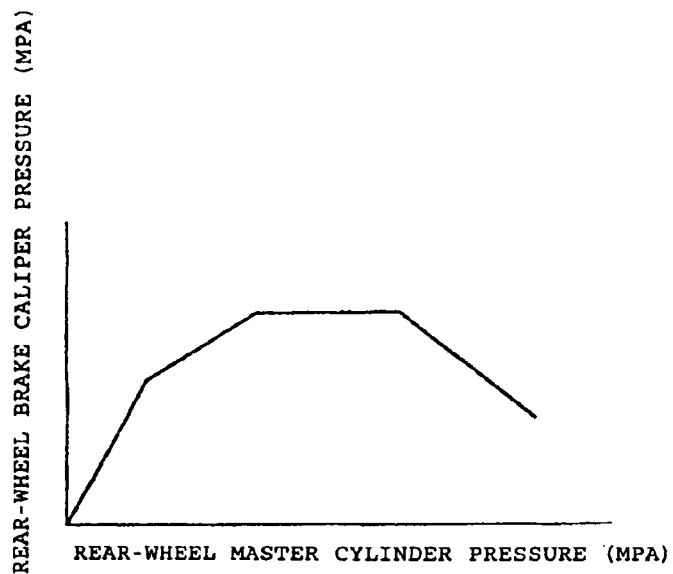
FIG. 9 is a graph illustrating the relationship between the rear-wheel master cylinder pressure and the rear-wheel brake caliper pressure.

Description will be made, with reference to FIG. 9, of the relationship between the rear-wheel master cylinder pressure (horizontal axis: MPa) and the rear wheel brake caliper pressure (vertical axis: Mpa). Settings are made so that, as the rear wheel master cylinder pressure increases gradually, the rear wheel brake caliper pressure initially also increases gradually, but afterwards the rate of the increase becomes lower. When the rear-wheel master cylinder pressure further increases, the rear-wheel brake caliper pressure becomes fixed at its maximum value, and then rear-wheel brake caliper pressure drops even if the rear-wheel master cylinder pressure increases.

In a motorcycle, the reduction in vertical load on the rear wheel side is relatively large during braking. For this reason, the above described setting is made so that even if the rear wheel master cylinder pressure increases, the rear-wheel brake caliper pressure will quickly drop at the end.

In the CBS control as described above, when the wheel speed sensor 31 senses that the vertical load of either the front wheel or the rear wheel has quickly dropped, the controller 20 controls electric motor 23 to retract the piston 18 and to reduce the braking pressure of the brake caliper 4, so that the wheel slip ratio is controlled by the ABS control. During this operation, the first electromagnetic on-off valve V1 is closed to shut off the communication between the master cylinder 3 and the hydraulic modulator 6. Therefore, the variation in pressure due to the ABS control will not be transmitted to the brake actuating unit 2 of the rider. Thus, both the CBS control and the ABS control can be performed simultaneously.

Description will now be made, with reference to the graph of FIG. 10, of the process from the time of activation of the braking apparatus to stop the vehicle, to the transition to the power-saving mode after the vehicle has stopped.

Figure 10:
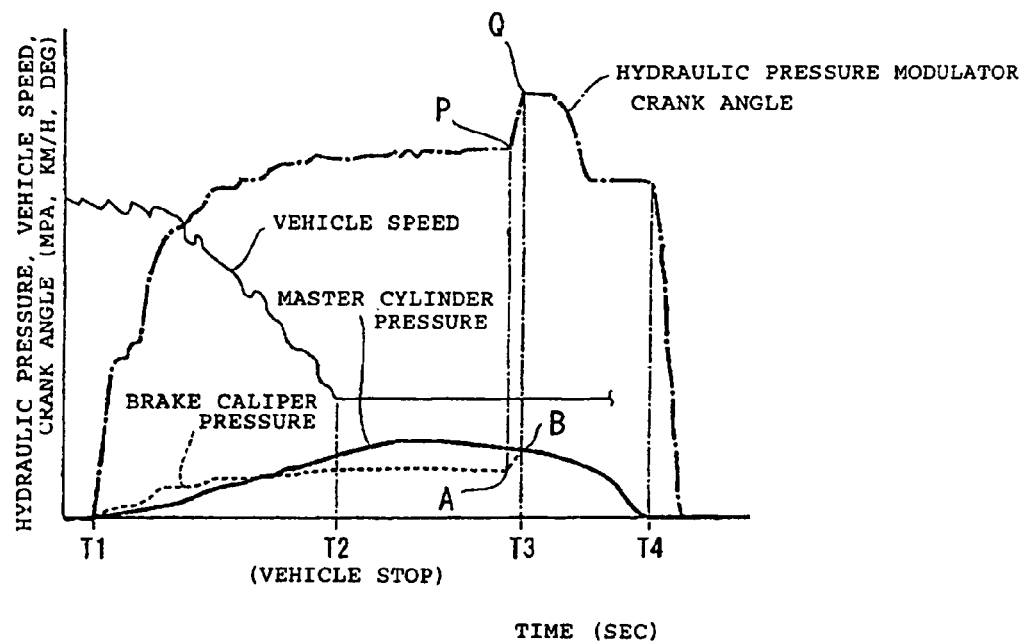
FIG. 10 is a graph illustrating the master cylinder hydraulic pressure, vehicle speed, and hydraulic pressure modulator crank angle with respect to time, from initial braking to the stoppage of the vehicle and to the time the hydraulic modulator returns to its initial position.

As seen in FIG. 10, upon operation of the brake actuating unit 2, for example when brake lever 2a is operated (time T1), the first electromagnetic on-off valve V1 is energized so as to be placed in a closed state. Concurrently, the third electromagnetic on-off valve V3 is energized so as to be opened, whereby the master cylinder pressure indicated by the bold solid line rises. Accordingly, the crank angle of the cam mechanism 21 in the hydraulic modulator 6, indicated by the alternate long and short dash line, increases. This makes the piston 18 to move forward to increase the brake caliper pressure, indicated by the broken line, and braking is performed. Thereby, as indicated by the thin solid line, the vehicle speed drops until the vehicle stops (time T2: vehicle stop).

The "vehicle stop" here is determined by considering the vehicle speed as zero when the vehicle speed remains a predetermined vehicle speed (e.g., 5 km/h) or less for at least a predetermined time (e.g., 0.5 seconds).

Thus, the vehicle is deemed to have stopped when the vehicle remains at a vehicle speed of a predetermined speed or less for at least a predetermined time, and the hydraulic pressure can be adjusted under the vehicle condition equivalent to the stop. Therefore, unpleasant sensation will not be given to the operating rider.

Since the rider is still operating the brake actuating unit 2 after the vehicle stop, the brake caliper pressure and the master cylinder pressure indicated by the bold solid line are held. However, when the pressure sensors 28 and 29 detect, after the vehicle stop, that the brake caliper pressure is lower than the master cylinder pressure, the brake caliper pressure will be increased by the difference therebetween. Specifically, the crank angle P of the cam mechanism 21 in the hydraulic modulator 6 is increased to an angle Q to move the piston 18 forward, so that the brake caliper pressure A is increased to a pressure similar to the master cylinder pressure B (time T3).

The adjustment of the crank angle of the cam mechanism 21 is done by adjusting the current value. The current value is determined based on the input duty ratio by the PWM control. Thus, the position of the piston 18, which is decided by the rotational position of the cam mechanism 21 described above, can be electrically adjusted correctly and easily. As the result, the pressure of the hydraulic chamber 19 can be set correctly.

When the brake caliper pressure has reached the pressure B similar to the master cylinder pressure, the energization of the third electromagnetic on-off valve V3 is stopped. As a result, the third electromagnetic on-off valve becomes closed, so that the communication between the hydraulic modulator 6 and the main brake path 5 is shut off. At the same time as or immediately after the closing of the third electromagnetic valve V3, the energization of the first and second electromagnetic on-off valves V1 and V2 is stopped (the state shown in FIG. 1). The second electromagnetic on-off valve V2 is thus closed to shut off the communication between the master cylinder 3 and the fluid-loss simulator 9. The first electromagnetic on-off valve V1 is thus opened to establish communication between the master cylinder 3 and the side of the main brake path 5 closer to the brake caliper 4. As a result, the stroke on the master cylinder 3 side is held unchanged, while the braking force is maintained by the hydraulic pressure of the brake caliper 4.

When the rider then releases the brake actuating unit 2, the hydraulic fluid is returned from the brake caliper 4 side to the master cylinder 3, while at the same time, the hydraulic fluid which has been left in the fluid-loss simulator 9 is returned to the master cylinder 3 via the bypass path 15 and the check valve 16. After that, the crank angle of the cam mechanism 21 in the hydraulic modulator 6 is reduced to move the piston 18 slightly backwards. At the time (time T4) when the hydraulic pressure on the input side of the brake circuit has become equal to the atmospheric pressure, the controller 20 supplies rated current to the third electromagnetic on-off valve V3 to open the same. The controller 20 at the same time activates the electric motor 23 to reduce the crank angle to the initial position for moving the piston 18 backwards to its initial position within the hydraulic modulator 6. After that, the energization of the third electromagnetic on-off valve V3 is stopped to close the same.

The description above has been made of a case when the vehicle has stopped with the brake actuating unit 2 being operated but the ABS not being activated. However, similar control is possible also when the vehicle is stopped with the ABS being activated. Specifically, in the case when the ABS is activated, the pressure in the hydraulic chamber 19 is reduced, held, or reincreased by the ABS. Therefore, the magnitude relationship between the pressure on the master cylinder 3 side and the pressure on the brake caliper 4 side cannot be determined based on at which time point the vehicle has stopped. Accordingly, the driving of forward/reverse rotation of the electric motor 23 is used and PWM controlled to adjust the current value decided by the input duty ratio, whereby the position of the piston 18 decided by the rotational position of the cam mechanism 21 can be electrically adjusted correctly, easily and freely regardless whether the adjustment is done to increase or reduce the pressure.

Figure 11:
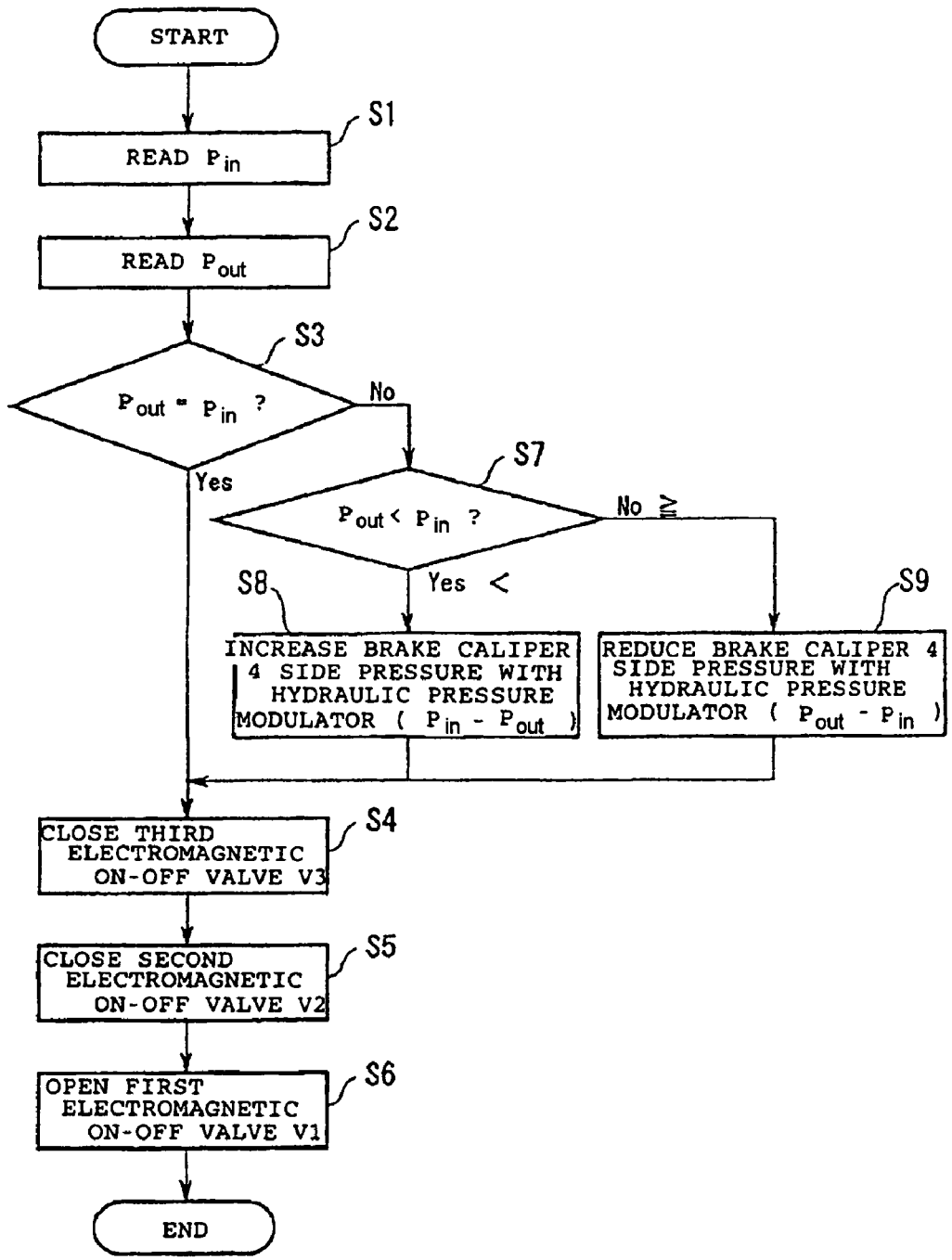
FIG. 11 is a flowchart illustrating the process used to equalize the brake caliper pressure and the master cylinder pressure after the stoppage of the vehicle in FIG. 10.

Description will now be made, with reference to the flowchart of FIG. 11, of the process used to equalize the brake caliper pressure and the master cylinder pressure after the vehicle has stopped as described above, that is, for opening/closing the first to third electromagnetic on-off valves V1, V2 and V3.

In step S1, a pressure value ($P_{in}$) of the pressure sensor 28, which detects the pressure of the main brake path 5 on the side closer to the master cylinder 3 relative to the first electromagnetic on-off valve V1, or the input side, is read in. In step S2, a pressure value ($P_{out}$) of the pressure sensor 29, which detects the pressure of the main brake path 5 on the side closer to the brake caliper 4 relative to the first electromagnetic on-off valve V1, or the output side, is read in. In step S3, it is determined whether or not the pressure value $P_{in}$ is equal to the pressure value $P_{out}$. If it is determined that they are equal to each other (the pressure value $P_{in}$=the pressure value $P_{out}$), or they are slightly different and the difference is permissibly small, the processing proceeds to step S4. In step S4, the energization of the third electromagnetic on-off valve V3 is stopped so as to close the third electromagnetic on-off valve V3, whereby the communication between the hydraulic modulator 6 and the main brake path 5 is shut off.

Subsequently, in step S5, energization of the second electromagnetic on-off valve V2 is stopped to close the second electromagnetic on-off valve V2 so that the communication between the master cylinder 3 and the fluid-loss simulator 9 is shut off. In step S6, energization of the first electromagnetic valve V1 is stopped to open the first electromagnetic on-off valve V1, so that communication is established between the master cylinder 3 side and the brake caliper 4 side of the main brake path 5. The processing is thus terminated.

As a result, the stroke of the master cylinder 3 side is held unchanged, while the braking force is maintained by the hydraulic pressure of the brake caliper 4.

On the other hand, if the determination result in step S3 is "NO", then in step S7, it is determined whether or not the pressure value $P_{in}$ is smaller than the pressure value $P_{out}$. If the determination result is "YES", the processing proceeds to step S8, where the hydraulic modulator 6 is activated to increase the pressure by the pressure difference $P_{in}-P_{out}$. After the pressure of the brake caliper 4 side has been increased by the hydraulic modulator 6, the processing proceeds to step S4. If the determination result in step S7 is "NO", the processing proceeds to step S9, where the hydraulic modulator 6 is activated to reduce the pressure by the pressure difference $P_{out}-P_{in}$. After the pressure of the brake caliper 4 side has been reduced by the hydraulic modulator 6, the processing proceeds to step S4.

Accordingly, when energization to the first electromagnetic on-off valve V1 is stopped to close the same, the difference in hydraulic pressure is eliminated between the master cylinder 3 side and the brake caliper 4 side of the main brake path 5. Therefore, no shock will be generated by the difference in hydraulic pressure between the master cylinder 3 side and the brake caliper 4 side of the main brake path 5, and no shock will be transmitted from the brake actuating unit 2a, 2b to the rider operating the brake actuating unit 2a, 2b. Further, no stroke variations will occur in the brake actuating unit 2a, 2b.

According to the illustrative embodiment as described above, when the vehicle is stopped by the operation of the brake actuating unit 2a, 2b with the first electromagnetic on-off valve V1 being closed, if the pressure of the main brake path 5 on the side closer to the master cylinder 3 relative to the first electromagnetic on-off valve V1 (the input-side pressure value $P_{in}$) is larger than the pressure of the main brake path 5 on the side closer to the brake caliper 4 relative to the first electromagnetic on-off valve V1 (the output-side pressure value $P_{out}$), the difference therebetween ($P_{in}-P_{out}$) is applied to the master cylinder 3 side by the hydraulic modulator 6 to equalize the input-side and output-side pressures. In contrast, if the pressure of the main brake path 5 on the side closer to the master cylinder 3 relative to the first electromagnetic on-off valve V1 (the input-side pressure value $P_{in}$) is smaller than the pressure of the main brake path 5 on the side closer to the brake caliper 4 relative to the first electromagnetic on-off valve V1 (the output-side pressure value $P_{out}$), the difference therebetween ($P_{in}-P_{out}$) is reduced from the pressure on the master cylinder 3 side by the hydraulic modulator 6 to equalize the input-side and output-side pressures.

As a result, when the first electromagnetic on-off valve V1 is subsequently opened, movement of the hydraulic fluid, which would otherwise be caused by the pressure difference in the main brake path 5, will not occur, and hence the stroke variations will not occur in the brake actuating unit 2a, 2b. Accordingly, the product performance can be improved.

In particular, even if the vehicle is stopped after activation of the ABS, and it is impossible to determine, according to the nature of the ABS, at which point of time the vehicle is stopped, when the hydraulic modulator 6 is reducing the pressure, holding the pressure, or re-increasing the pressure, the input-side pressure and the output-side pressure can be detected, as described above, to finely adjust the current value which is decided according to the input duty ratio by PWM controlling the electric motor 23, so that the hydraulic modulator 6 can be rapidly activated to increase or reduce the pressure correctly. Accordingly, the present invention is advantageous in the fact the pressure reducing or pressure increasing operation of the hydraulic modulator 6 used for the ABS can be effectively utilized.

It should be understood that this invention is not limited to the embodiment described above, but is also applicable, for example, to a motorcycle employing the electronic brake system and having no CBS. The embodiment has been described using an example of the case that the hydraulic pressure is adjusted by the hydraulic modulator 6 after the stoppage of the vehicle (the vehicle speed=0). However, the hydraulic pressure may be adjusted by the hydraulic modulator 6 while the vehicle is still running at a low speed before stopping.

It should be understood that this invention is not limited to the embodiment described above, but is also applicable to, for example, a vehicle other than a motorcycle. Although, according to the illustrative embodiment above, the hydraulic pressure is applied from the brake actuating unit 2 directly to the brake caliper 4 by the main brake path on the front wheel side, the electronic brake system may be employed to activate the hydraulic modulator 6. The same applies to the case in which the rear-wheel brake actuating unit is operated first and the front-wheel brake system works in conjunction therewith.

While a working example of the present invention has been described above, the present invention is not limited to the working example described above, but various design alterations may be carried out without departing from the present invention as set forth in the claims.

What is claimed is:

1. A braking apparatus for a motorcycle, said braking apparatus comprising:
    a brake actuating unit for receiving input from an operator of the motorcycle;
    a master cylinder working in conjunction with the brake actuating unit;
    a wheel brake member for applying braking force to a wheel by means of hydraulic pressure operation;
    a main brake path which connects the master cylinder and the wheel brake member;
    a normally-open electromagnetic on-off isolation valve provided in the main brake path, the normally-open electromagnetic on-off isolation valve being closed during a braking operation;
    a hydraulic modulator driven by an electric actuator;
    a hydraulic pressure sensor for detecting hydraulic pressure applied to the wheel brake member;
    an electronic controller for controlling operation of the hydraulic modulator,
    wherein the hydraulic modulator and the wheel brake member are connected via a two-way supply and exhaust path, the supply and exhaust path being provided with a single normally-closed electromagnetic valve, wherein the hydraulic modulator is operable to selectively increase or decrease the hydraulic pressure applied to the wheel brake member, the hydraulic pressure sensor constantly detects the hydraulic pressure applied to the wheel brake member, and the electronic controller constantly monitors the braking state of the wheel brake member based on the detected pressure and controls the hydraulic modulator based on the monitored braking state; and
    an antilock brake system (ABS) which adjusts the hydraulic pressure of the main brake path on a side closer to the wheel brake member relative to the normally-open electromagnetic on-off isolation valve by operation of the hydraulic modulator to control a slip ratio between a braking wheel and a road surface, the hydraulic modulator being controlled to supply hydraulic pressure to the wheel brake member, during the braking operation, according to the operational state of the brake actuating unit, wherein the apparatus is configured such that during ABS operation the isolation valve is closed to prevent fluid communication between the brake actuating unit and the hydraulic modulator so that pressure variations caused by the ABS are isolated from the brake actuating unit;

wherein when the vehicle speed has become a predetermined speed or less when the motorcycle is being braked by the brake actuating unit, the pressure of the main brake path on a side closer to the master cylinder relative to the normally-open electromagnetic on-off isolation valve, and the pressure of the main brake path on the side closer to the wheel brake member relative to the normally-open electromagnetic on-off isolation valve are detected, and are equalized by operation of the hydraulic modulator before opening the normally-open electromagnetic on-off isolation valve.

2. The braking apparatus for a motorcycle according to claim 1, wherein when the vehicle speed has become a predetermined speed or less, and regardless of whether the ABS is operated, an input duty ratio of the electric actuator is adjusted to perform adjustment of the hydraulic modulator so that the pressure of the main brake path on the side closer to the master cylinder relative to the normally-open electromagnetic on-off isolation valve becomes equal to the pressure of the main brake path on the side closer to the wheel brake member relative to the normally-open electromagnetic on-off isolation valve.

3. The braking apparatus for a motorcycle according to claim 1, wherein it is determined whether or not the vehicle speed is a predetermined speed or less when the vehicle speed remains substantially unchanged for at least a predetermined period of time.

4. A braking apparatus for a motorcycle, the braking apparatus comprising:
a brake actuating unit;
a master cylinder which operates in conjunction with the brake actuating unit;
a wheel brake member which applies braking force to a motorcycle wheel by means of hydraulic pressure operation;
a hydraulic modulator;
a hydraulic pressure sensor for detecting hydraulic pressure applied to the wheel brake member; and
an electronic controller for controlling operation of the hydraulic modulator;
wherein the hydraulic modulator and the wheel brake member are connected via a two-way supply and exhaust path, the supply and exhaust path being provided with a single normally-closed electromagnetic valve, wherein the hydraulic modulator is operable to selectively increase or decrease the hydraulic pressure applied to the wheel brake member, and the hydraulic pressure sensor constantly detects the hydraulic pressure applied to the wheel brake member, and the electronic controller constantly monitors the braking state of the wheel brake member based on the detected pressure and controls the hydraulic modulator based on the monitored braking state;

an output side of the master cylinder is connected to an input side of the wheel brake member via a hydraulic path, and a normally-open electromagnetic on-off isolation valve is arranged at a middle portion of the hydraulic path to selectively conduct or block hydraulic pressure therein, wherein the braking apparatus is configured to
detect a first hydraulic pressure adjacent to the master cylinder and a second hydraulic pressure adjacent to the wheel brake member;
operate the hydraulic modulator to generate hydraulic pressure; and
electrically control the hydraulic pressure applied to the wheel brake member so as to correspond with the first hydraulic pressure,
wherein when there is a difference between the first hydraulic pressure and the second hydraulic pressure after the vehicle speed has become a predetermined vehicle speed or less, the hydraulic modulator is then operated and controlled to equalize the hydraulic pressure on a side of the normally-open electromagnetic on-off isolation valve nearest the master cylinder and the hydraulic pressure on a side of the normally-open electromagnetic on-off isolation valve nearest the wheel brake member, and
the energization of the normally-open electromagnetic on-off isolation valve is stopped to open the hydraulic path after the first hydraulic pressure has become equal to the second hydraulic pressure.

5. A method of controlling a braking apparatus for a vehicle, wherein the braking apparatus is configured to activate an antilock brake system (ABS) by means of hydraulic pressure when slippage of a wheel is detected during a brake operation, the braking apparatus comprising:
a brake actuating unit for receiving input from an operator of the vehicle;
a brake member operatively attached to a wheel of the vehicle and configured to selectively brake the wheel;
a main brake line for selectively transmitting hydraulic pressure between the brake actuating unit and the brake member;
an electromagnetic isolation valve in the main brake line for selectively isolating the brake member from the brake actuating unit;
a hydraulic pressure sensor for detecting hydraulic pressure applied to the brake member; and
an electronic controller for controlling operation of a hydraulic modulator for regulating hydraulic pressure applied to the brake member, wherein the hydraulic modulator and the brake member are connected via a single two-way supply and exhaust path, the supply and exhaust path being provided with a single electromagnetic valve, wherein the hydraulic modulator is operable to selectively increase or decrease the hydraulic pressure applied to the brake member, and wherein the hydraulic pressure sensor constantly detects the hydraulic pressure applied to the brake member, and the electronic controller constantly monitors the braking state of the brake member based on the detected pressure and controls the hydraulic modulator based on the monitored braking state, the method of controlling the braking apparatus comprising the steps of:
determining whether ABS activation is required;
detecting a hydraulic pressure applied to the brake member;

determining whether or not vehicle speed is a predetermined speed or less when the vehicle speed remains substantially unchanged for at least a predetermined period of time; and reducing the hydraulic pressure applied to the brake member to a pressure reduction target value based on the detection result of the hydraulic pressure sensor at the time when the ABS is activated, wherein during ABS operation, the isolation valve is closed to prevent fluid communication between the brake actuating unit and the hydraulic modulator so that pressure variations caused by the ABS are isolated from the brake actuating unit, wherein the method step of reducing hydraulic pressure applied to the brake member to a pressure reduction target value comprises the following method steps:

determining whether the detected hydraulic pressure is less than a predetermined pressure, determining whether a variation of an estimated vehicle speed per unit time is greater than a predetermined value, using a map of preset values for a road having a high coefficient of friction to determine the pressure reduction target value when either the detected hydraulic pressure is greater than the predetermined pressure or the variation of the estimated vehicle speed per unit time is less than the predetermined value, and using a map of preset values for a road having a low coefficient of friction to determine the pressure reduction target value when both the detected hydraulic pressure is less than the predetermined pressure and the variation of the estimated vehicle speed per unit time is greater than the predetermined value.

6. The method of controlling a braking apparatus of claim 5, wherein the braking apparatus further comprises a front wheel speed detector, and a rear wheel speed detector, and wherein the method step of determining whether ABS activation is required comprises the following method steps:

detecting the front wheel speed;
detecting the rear wheel speed;
estimating a vehicle speed;
calculating a slip ratio of each of the front and rear wheels based on a difference between detected wheel speed and estimated vehicle speed for each respective wheel;
determining whether the front wheel slip ratio is at least a predetermined slip ratio which corresponds to initiation of the ABS for the front wheel based on a pre-stored map of the front-wheel slip ratio versus hydraulic pressure;
initiating ABS on the front wheel if the determination of the preceding step is positive;
determining whether the rear wheel slip ratio is at least a predetermined slip ratio which corresponds to initiation of the ABS for the rear wheel based on a pre-stored map of the rear-wheel slip ratio versus hydraulic pressure; and
initiating ABS on the rear wheel if the determination of the preceding step is positive.

7. A method of controlling a braking apparatus for a motorcycle, the braking apparatus comprising:

a brake actuating unit;
a master cylinder working in conjunction with the brake actuating unit;
a wheel brake member for applying braking force to a wheel by means of hydraulic pressure operation;
a main brake path which connects the master cylinder and the wheel brake member;
a normally-open electromagnetic on-off isolation valve provided in the main brake path, the normally-open electromagnetic on-off isolation valve being closed during a braking operation;
a hydraulic pressure sensor for detecting hydraulic pressure applied to the wheel brake member;
an electronic controller for controlling operation of a hydraulic modulator driven by an electric actuator, wherein the hydraulic modulator and the wheel brake member are connected via a two-way supply and exhaust path, the supply and exhaust path being provided with a single normally-closed electromagnetic on-off valve, wherein the hydraulic modulator is operable to selectively increase or decrease the hydraulic pressure applied to the wheel brake member, and wherein the hydraulic pressure sensor constantly detects the hydraulic pressure applied to the wheel brake member, and the electronic controller constantly monitors the braking state of the wheel brake member based on the detected pressure and controls the hydraulic modulator based on the monitored braking state; and an antilock brake system (ABS) which adjusts the hydraulic pressure of the main brake path on a side closer to the wheel brake member relative to the normally-open electromagnetic on-off isolation valve by means of the hydraulic modulator to control a slip ratio between a braking wheel and a road surface, wherein during ABS operation, the isolation valve is closed to prevent fluid communication between the brake actuating unit and the hydraulic modulator so that pressure variations caused by the ABS are isolated from the brake actuating unit, the hydraulic modulator being controlled, during a braking operation, according to the operational state of the brake actuating unit to supply hydraulic pressure to the wheel brake member, the method steps comprising:

determining whether the vehicle speed is equal to or less than a predetermined speed when the motorcycle is being braked by the brake actuating unit, detecting the pressure of the main brake path on a side closer to the master cylinder relative to the normally-open electromagnetic on-off isolation valve, detecting the pressure of the main brake path on the side closer to the wheel brake member relative to the normally-open electromagnetic on-off isolation valve, determining whether the pressure of the main brake path on the side closer to the master cylinder relative to the normally-open electromagnetic on-off isolation valve is substantially equal to the pressure of the main brake path on the side closer to the wheel brake member relative to the normally-open electromagnetic on-off isolation valve, adjusting the hydraulic pressure of the main brake path on the side closer to the wheel brake member relative to the normally-open electromagnetic on-off isolation valve by operation of the hydraulic modulator so that the hydraulic pressure of the main brake path on each side of the normally-open electromagnetic on-off isolation valve becomes substantially equal, when it is determined that the pressure of the main brake path on the side closer to the master cylinder relative to the normally-open electromagnetic on-off isolation valve is not substantially equal to the pressure of the main brake path on the side closer to the wheel brake member relative to the normally-open electromagnetic on-off isolation valve, and opening the normally-open electromagnetic on-off isolation valve.

8. A braking apparatus for a motorcycle comprising:

a brake actuating unit;

a master cylinder working in conjunction with the brake actuating unit;

a wheel brake member for applying braking force to a wheel by means of hydraulic pressure operation;

a main brake path which connects the master cylinder and the wheel brake member;

a normally-open first electromagnetic on-off isolation valve provided in the main brake path, the first electromagnetic on-off isolation valve being closed during a braking operation;

a hydraulic pressure sensor for detecting hydraulic pressure applied to the wheel brake member;

an electronic controller for controlling operation of a hydraulic modulator driven by an electric actuator, the hydraulic modulator being connected to the main brake path on a side closer to the wheel brake member relative to the first electromagnetic on-off isolation valve, the hydraulic modulator being controlled during the braking operation according to the operational state of the brake actuating unit to supply hydraulic pressure to the wheel brake member;

wherein the hydraulic modulator and the wheel brake member are connected via a two-way supply and exhaust path, wherein the hydraulic modulator is operable to selectively increase or decrease the hydraulic pressure applied to the wheel brake member, and wherein the hydraulic pressure sensor constantly detects the hydraulic pressure applied to the wheel brake member, and the electronic controller constantly monitors the braking state of the wheel brake member based on the detected pressure and controls the hydraulic modulator based on the monitored braking state;

an antilock brake system (ABS) which adjusts the hydraulic pressure of the main brake path on the side closer to the wheel brake member relative to the first electromagnetic on-off isolation valve by means of the hydraulic modulator to control a slip ratio between a braking wheel and a road surface, wherein during ABS operation, the isolation valve is closed to prevent fluid communication between the brake actuating unit and the hydraulic modulator so that pressure variations caused by the ABS are isolated from the brake actuating unit;

a fluid loss modulator connected to the main brake path on a side closer to the master cylinder relative to the first electromagnetic on-off isolation valve;

a normally-closed second electromagnetic on-off valve provided between the fluid loss modulator and the main brake path, the second electromagnetic on-off valve being open during a braking operation, a normally-closed third electromagnetic on-off valve provided between the hydraulic modulator and the main brake path, the third electromagnetic on-off valve being open during a braking operation;

wherein when the vehicle speed has become a predetermined speed or less when the motorcycle is being braked by the brake actuating unit, the pressure of the main brake path on the side closer to the master cylinder relative to the first electromagnetic on-off isolation valve, and the pressure of the main brake path on the side closer to the wheel brake member relative to the first electromagnetic on-off isolation valve are detected and equalized by operation of the hydraulic modulator before opening the first electromagnetic on-off isolation valve, and closing of the second and third electromagnetic on-off valves.

* * * * *